United States Patent [19]

Fischer et al.

[11] Patent Number: 4,535,527

[45] Date of Patent: Aug. 20, 1985

[54] TOOL EXCHANGING DEVICE FOR A MULTI-SPINDLE MACHINE TOOL

[75] Inventors: Peter Fischer; Paul Schubert, both of Aalen, Fed. Rep. of Germany

[73] Assignee: Alfing Kessler Sondermaschinen GmbH, Aalen, Fed. Rep. of Germany

[21] Appl. No.: 512,953

[22] Filed: Jul. 12, 1983

[30] Foreign Application Priority Data

Nov. 16, 1982 [DE] Fed. Rep. of Germany ....... 3242439

[51] Int. Cl.³ ............................................ B23Q 3/157
[52] U.S. Cl. ...................................... 29/568; 29/26 A; 409/217
[58] Field of Search ...................... 29/26 A, 26 R, 568; 414/728, 751, 729, 618, 620, 680, 682; 409/217

[56] References Cited

U.S. PATENT DOCUMENTS

| | | | |
|---|---|---|---|
| 3,566,516 | 3/1971 | Brainard et al. | 29/568 |
| 3,571,912 | 3/1971 | Kielma | 29/568 |
| 3,646,664 | 3/1972 | Vearil | 29/568 |
| 4,125,932 | 11/1978 | Kielma | 29/568 |
| 4,238,034 | 12/1980 | Sipek | 29/568 X |

Primary Examiner—William R. Briggs
Attorney, Agent, or Firm—Books Haidt Haffner & Delahunty

[57] ABSTRACT

A machine tool for mounting on a lateral or console unit of a transfer machine comprises a spindle unit, drive elements, a number of processing spindles, and a tool exchanging device having a tool support for the receipt of used and new tools, which is movable from a charging position into an exchange position in front of the processing spindles. To improve the removal and charging possibilities for the tools, the tool support is moved from its charging position at the rear of the machine tool over the spindle unit and associated drive elements into the exchange position in front of said processing spindles.

19 Claims, 11 Drawing Figures

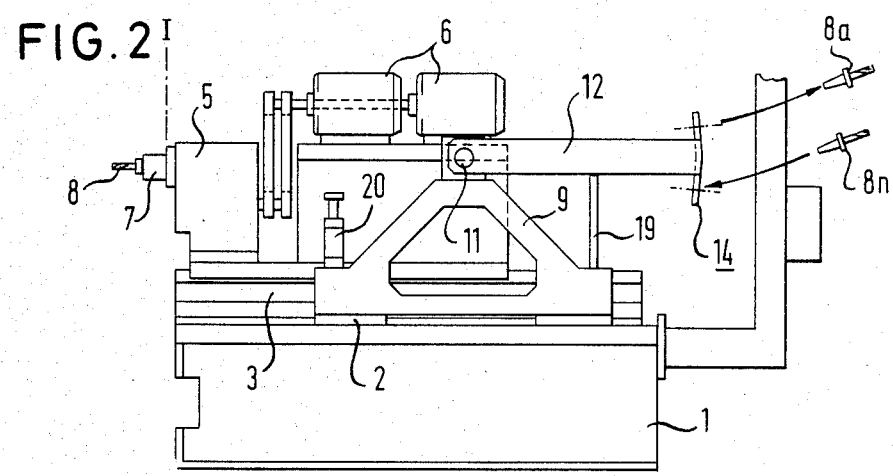
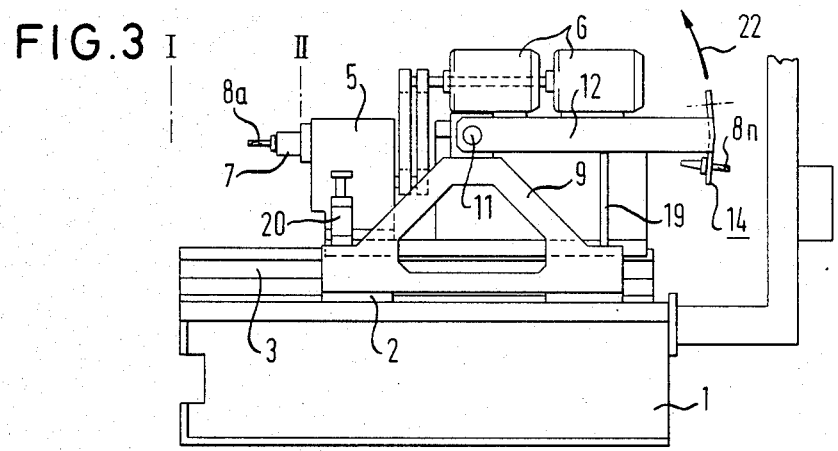
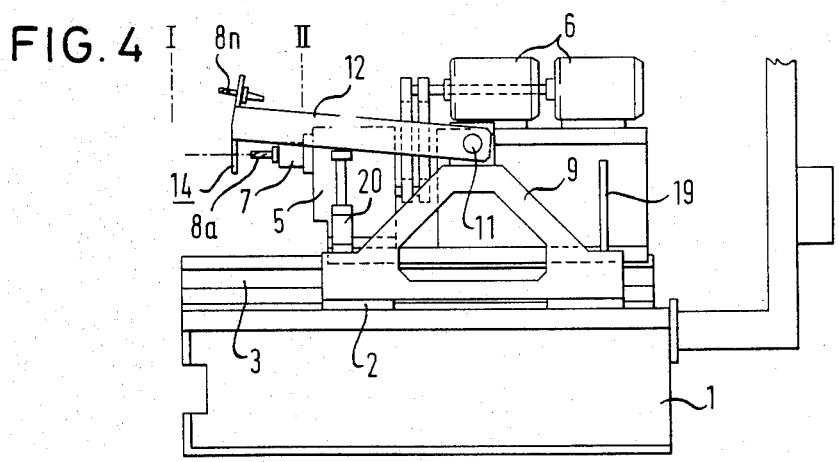

TOOL EXCHANGING DEVICE FOR A MULTI-SPINDLE MACHINE TOOL

The present invention relates to a machine tool for mounting on a lateral or console unit of a transfer machine, and having a tool exchanging device.

A transfer machine is to be understood as a device which by use of a conveyor or the like takes a workpiece sequentially to a plurality of work stations for processing by respective machine tool at such stations.

Tool exchanging devices for machine tools having a number of processing spindles, i.e. those for the so-called multi-spindle machine tools, are known. Their object is automatically to remove a set of adjacent tools driven by separate drive elements (e.g. drilling, sinking, thread cutting, fine drilling or similar tools) at the same time, and to replace them by a new set.

In the known tool exchanging devices of this type (cf. German Auslegeschrift No. 19 20 275), the tool support is designed as an arm rotatable around its longitudinal axis which at one end is pivotable around a vertical axis next to the machine tool. The arm bears two rows of tool carriers, which are offset by 90° relative to each other with respect to the rotary axis and are respectively fitted for the receipt of the tools to be removed (1st row) and the new tools (2nd row).

For relocation of the arm from the exchange position in front of the processing spindles into the charging position next to the machine tool, the arm is pivoted around a vertical axis next to the machine tool by about 90°. Since the arm covers a relatively large area in this pivotal motion, such known tool exchanging devices require a relatively large space in the very area in which owing to the connection of the lateral or console unit to the central unit of the transfer machine, only limited space is available. Moreover the arm is placed with the tool carriers in the charging position next to the lateral or console unit relatively close to the central unit, so that the removal of the replaced tool and the charging with new tools has to be done in the space between two lateral or console units, whereby because of the limited space available for the arrangement of the adjacent lateral or console unit, it is not possible to achieve the minimum spacing from the adjacent lateral or console unit as laid down by the DIN or other applicable standard. With machine tools provided with such tool exchanging devices, the need to provide greater spacings between the lateral or console units leads to relatively long transfer machines and thereby to increasingly costly production lines and to greater space requirements.

It is an object of the present invention to provide a tool exchanging device for a machine tool for mounting on a lateral or console unit of a transfer machine, which permits trouble-free removal and charging even when the lateral or console units are placed beside each other at a relatively close spacing, e.g. the minimum possible spacing under the DIN standard.

According to the invention, there is provided a machine tool for mounting on a lateral unit or console unit of a transfer machine, and comprising: a spindle unit; a plurality of processing spindles; drive elements for the spindle unit; and a tool support for the receipt of used and new tools, the tool support being movable from a charging position on the rear of the machine tool, over the spindle unit and the associated drive elements, to a tool exchange position in front of said processing spindles.

Thus, for the first time a machine tool has a tool exchanging device in which the tool support is not pivoted from its exchange position in front of the processing spindles, as in the past, laterally adjacent to the machine tool, but by its spindle unit and the associated drive elements into a charging position arranged at the rear of said machine tool.

This modus operandi has the advantage that the removal of the replaced tools and charging with the new ones does not have to be accomplished as in the past in the narrow passage between two lateral or console units, but can be done from the rear of the machine tool, where there is usually enough space. At the rear, the tools can be moved in the conventional manner by tool trolleys or automatic transport systems, and from there they can be placed manually or automatically into the tool support and removed therefrom. In the case of manual charging, it is not necessary for the operator to enter the constricted space between the lateral and console units of two adjacent machine tools and thus to enter the danger zone of the tools and tool spindles. The operator can therefore complete the removal of the replaced tools and the charging of new tools in an area which is relatively far removed from the rotating parts and tools, and is therefore completely safe.

The design also makes possible a construction in which, in contrast to the known designs, there are no parts or machine units of the tool exchanging device in the area in front of and next to the tools and processing spindles in the processing phase of the machine tool. This means that the critical and constricted space in the connection area of the lateral or console units to the central unit remains free from any device parts, so that there is more "room for manoeuvre" for the designer of machine tools.

In principle, the tool support can be moved from its charging position at the rear of the machine tool by its spindle unit and the associated drive elements in any manner into the exchange position in front of the processing spindles. Thus it is possible to provide guides, along which the tool support can slide. But an especially favorable embodiment results when the tool support is pivotable into the exchange position around a horizontal axis extending perpendicularly to the spindle axes.

An embodiment which is simple in design and relatively simple with respect to control requirements is attained in the case of the latter variant when the tool support is secured on the free ends of two arms respectively arranged on the sides of the machine tool, while the other ends of these arms are mounted pivotably around the axis extending perpendicularly to the spindle axes.

With designs in which the tool support is secured on pivotable arms, it is advantageous that the pivotable bearing of the arms should be located in bearing blocks respectively arranged near the machine tool. Thus the bearing of the tool exchanging device can be wholly independent, with a simple design, of the machine tool which can be moved back and forth uninfluenced by parts of the tool exchanging device between the bearing blocks on the slide units.

In the event of the use of bearing blocks to receive the bearing for the arms, it is advantageous that the bearing blocks should be secured by means of an intermediate plate-shaped adapter unit on the top of the lateral or console unit. By such a design the exchanging of the lateral or console units, which are made as standard elements, to accept the bearing blocks is unnecessary.

Basically it is possible to make the pivotal motion in the most varied ways. But it is especially expedient when each arm has its own pivotal drive and these drives are interconnected by a rigid shaft. The provision of two separate pivotal drives has the advantage that they can be made smaller and therefore they save space when arranged at the sides of the machine tool. The synchronisation of the two pivotal drives is ensured by the rigid shaft.

The alignment of the tool support in the exchange position can be variously achieved. It is advantageous to carry out this alignment in two stages, i.e. first a rough and then a fine adjustment.

For the rough adjustment it is expedient to provide adjustable stops on the bearing blocks, which interact with stopping surfaces on the arms. Such an arrangement is simple to design and is safe in operation. For fine adjustment, it is advantageous to provide corresponding guide devices which are secured on the tool support and on the spindle unit. By this arrangement, play at the stop devices for the tool support or on the slide unit of the machine tool can have no influence on the fine adjustment, since the tool support is centered via the guide devices on the spindle unit directly.

In such a case it is expedient that the guide device should have guide rods which interact with guide bushes. Such guide devices have proven themselves and are reliable even after long use.

In a preferred embodiment, the guide rods are arranged on the side of the spindle unit parallel to the spindles, and are dimensioned so that in the tool transfer position they project into the guide bushes in the tool support.

Such a design has the advantage that the fine adjustment is made automatically when the spindle unit moves to the tool transfer position and the coupling of the tool support with the spindle unit caused thereby is released when the latter returns to its withdrawn starting point.

In principle, the tool support can be connected with the arms in various ways.

Thus it is possible for the tool support to be rigidly connected with the arms or to be rotatably connected for pivoting around a horizontal axis perpendicular to the spindle axes, or around an axis parallel to the spindle axes.

A rigid connection of the tool support with the arms has the advantage that no bearings and drives for the tool support are necessary. However in such a case it is essential to provide two stop positions, in one of which the used tools are transferred from the processing spindles to the tool support, while in the other stop position the tools are passed from the tool support to the processing spindles.

In the event that the tool support is mounted rotatably about a horizontal axis perpendicular or parallel to the spindle axes on the arms, it is only necessary to provide one stop position, in which both the transfer of the used tools and the receipt of the new tools are performed.

The tool supports can be designed in various ways. But it is especially preferred when the tool supports are designed in the form of plates, frames or the like, in which apertures for reception of the tools are provided.

To reduce the necessary drive power for pivoting the arms, they should each be fitted with a counterweight or equalizer spring arrangement.

For further explanation and better understanding three embodiments of a tool exchanging device according to the invention are described in more detail below with reference to the attached drawings, in which:

FIGS. 2 to 7 show schematically, to explain the modus operandi of the tool exchanging device according to FIG. 1, six phases of the tool exchange, each in side view;

Figure 1:
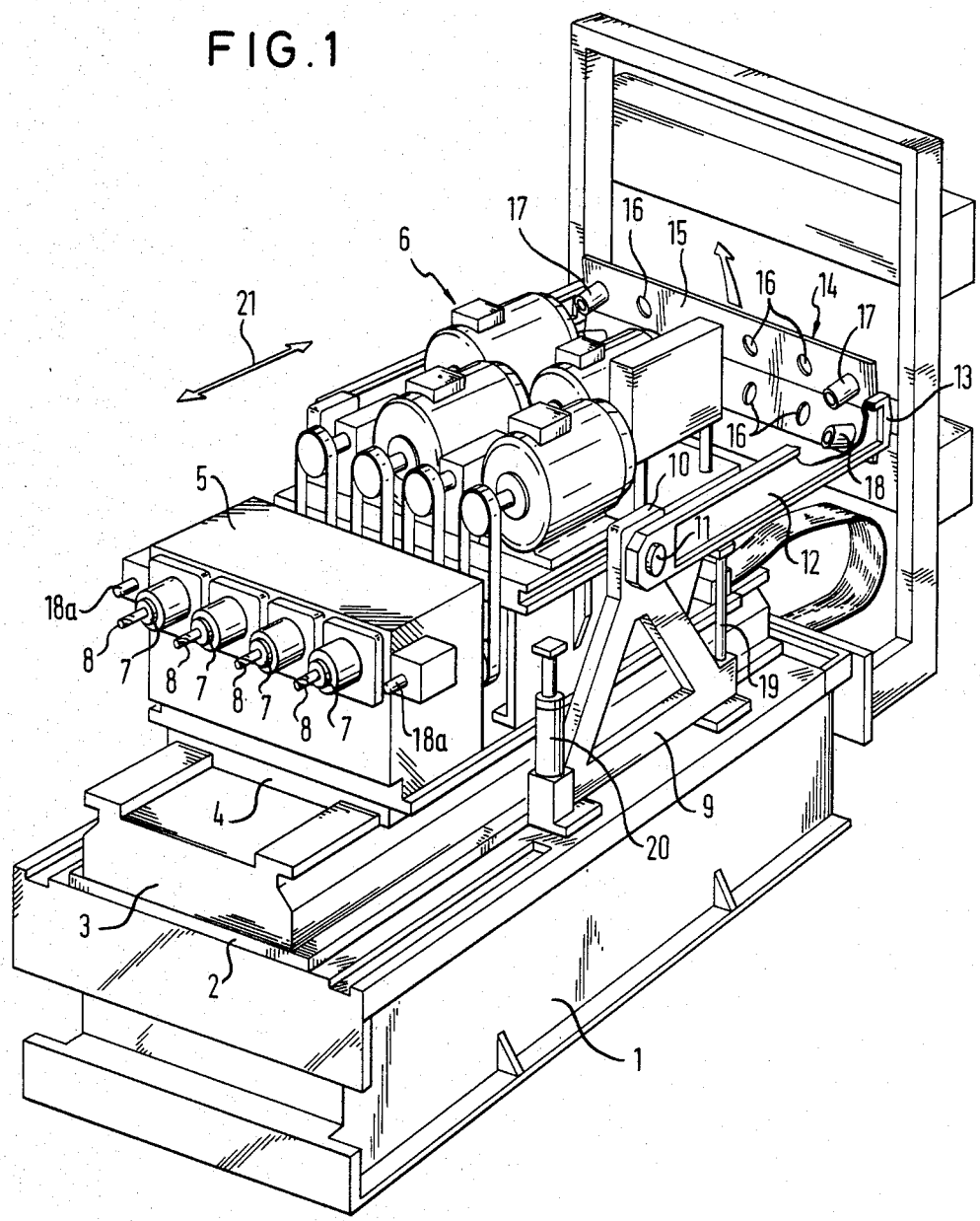
FIG. 1 shows schematically in a perspective total view a multi-spindle machine tool according to the invention arranged on a lateral unit of a transfer machine (not shown), which is equipped with a tool exchanging device.

In the embodiment of FIG. 1, an intermediate plate-shaped adapter unit 2 is arranged on the top of a lateral unit 1 of a transfer machine. This adapter unit 2 supports on its top side a slide unit 3, on whose slides 4 a spindle unit 5 is disposed with its drive elements 6. The spindle unit 5 has in this embodiment four processing spindles 7, which are each charged with a tool 8.

On both sides of spindle unit 5 and drive elements 6 there are bearing blocks 9 on the top of the intermediate plate-shaped adapter unit 2, which bearing blocks 9 support in the area of their top end 10 a bearing 11 for one end of the arms 12, on the free ends 13 of which a tool support 14 is secured. This support 14 is designed as a plate 15 in this case, having apertures 16 for the tools 8.

In the present case, there are two rows of superimposed apertures 16 in the plate 15. The center-to-center spacing between the apertures 16 corresponds exactly to the center-to-center spacing of the tools 8 or of the processing spindles 7.

Outside the apertures 16 of each row, there are guide bushes 17 and 18 in the plate 15, into which, as will be explained later, guide rods 18a, arranged laterally on the spindle unit 5, can be inserted.

The bearing blocks 9 are provided with stops 19 and 20, on which the arms 12 rest in the corresponding position. Whereas the stop 19 has a predetermined fixed height, stop 20 has two optionally adjustable stop positions, i.e. a first upper and second lower stop position.

Figure 5:
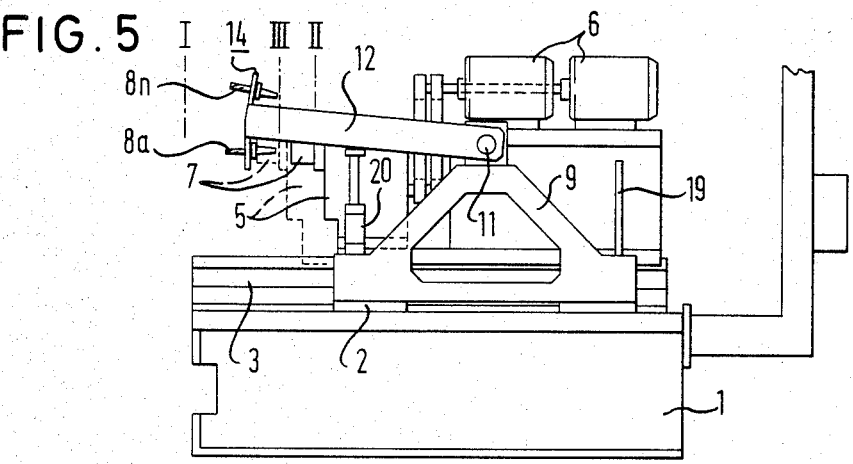
Figure 6:
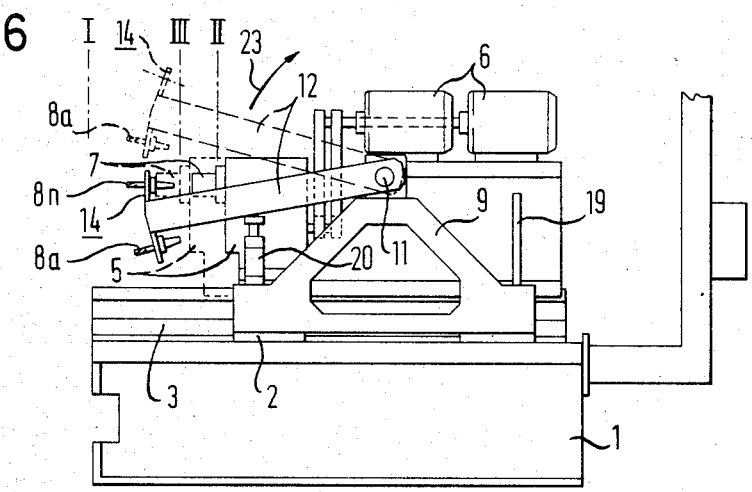

For pivoting the arms 12 around the bearing 11 a pivotal drive is provided, which in the present embodiment has not been shown for the sake of clarity. By this pivotal drive the arms 12 (and thus also the tool support 14) can be pivoted out of the charging position which is shown in FIGS. 1, 2, 3 or 7, and into the exchange position which is shown in FIGS. 4 and 5 or 6.

A drive is also provided (not illustrated) with which the spindle unit 5 including its drive element 6 can be moved back and forth via the slide 4 on the slide unit 3 in the direction of the arrow 21. Only three positions in this back and forth movement are of importance, and they are shown in FIGS. 2 to 7 by the Roman numerals I to III.

Position I is the processing position, in which the workpiece (not shown) is processed by the tools 8 held in the processing spindles 7.

Position II shows the withdrawn start position, in which the spindle unit 5 with its drive element 6 has been driven back on the slide unit 3 so that the tool support 14 charged with the new tools can be pivoted unimpeded in front of the processing spindles 7 and their tools 8.

Position III shows the tool transfer or exchange position, in which, as will be explained later, the tools 8a to be exchanged are transferred to the tool support 14 and the new tools 8n are taken over by the tool spindles 7.

The automatic tool exchanging process now proceeds using a tool exchanging device according to the invention as follows:

As can be seen in FIG. 2 the spindle unit 5 is in the processing position I and carries out the preset processing of a workpiece (not shown). In this phase the tool support 15 is in its charging position on the rear of the machine tool, in which the arms 12 are resting on the stop 19.

While the processing unit 5 is carrying out the preset processing by means of the processing spindles 7 with the tools 8, at the rear of the machine tool, the used tools 8a are removed from the tool support 14 which is charged with new tools 8n. As shown by the arrows in FIG. 2, the used tools 8a were in the top row of apertures 16 (FIG. 1), while the new tools 8n were inserted in the lower row. When this process is ended, the top row of the tool support 15 is empty and the lower row is charged with new tools 8n, as shown in FIG. 3.

If tool exchange is now to be effected, the spindle unit 5 is withdrawn into the retracted start position II, as is also seen in FIG. 3. When the spindle unit has reached the start position II, the pivotal drive for the arms 12 is set in motion, and tool support 14 is pivoted in the direction of the arrow 22 until the arms 12 rest on the stop 20, as shown in FIG. 4. In this phase the stop 20 is in its first top position, in which the tools 8a in the processing spindles 7 are roughly aligned with the lower row of apertures, empty in this position.

Then the spindle unit 5 with its drive element 6 moves out of the retracted start position II, into the tool transfer position shown in FIG. 5 as III by the interrupted lines, in which the used tools 8a are held firmly, by devices not shown, in the apertures of the tool support 14. The clamping mechanism in the processing spindles 7 then releases the tools 8a, so that the spindle unit and thus the processing spindles can return without tools 8a to the withdrawn start position II. This phase of the tool change is also shown in FIG. 5.

Figure 7:
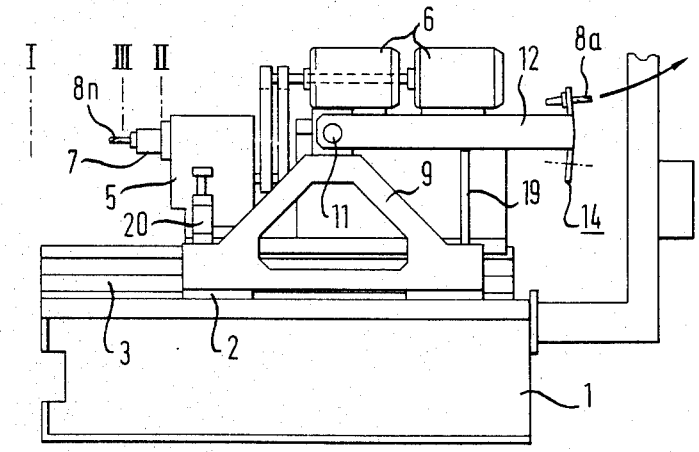

As soon as spindle unit 5 is in the withdrawn start position II, the stop 20 is moved into its two lower stop positions, i.e. in the present case it is lowered until the axes of the now empty processing spindles are flush with the axes of the new tools 8n, in the top row of apertures. When this position is reached, the spindle unit 5 moves out of the withdrawn start position II into the tool transfer position III, as shown in FIG. 6. The clamping devices of the processing spindles are actuated and grasp the new tools 8n, which are in the top row of apertures of the tool support 14. As soon as the new tools 8n have been grasped by the processing spindles, the spindle unit 5 is withdrawn from the tool transfer position III to the start position II, whereby the new tools 8n are extracted from the tool support 14. It can then, as shown by the broken lines in FIG. 6, be pivoted back in the direction of the arrow 23 into the charging position on the stops 19 as shown in FIG. 7.

Then the spindle unit 5 charged with the new tools 8n is thrust again into the processing position I, to carry out the next processing operation. During this time, as has been described in connection with FIG. 2, the used tools 8a are extracted from the tool support 14 and the lower row of apertures in this position is charged with the new tools 8n.

As described above with reference to the FIGS. 4 to 6, the rough alignment of the tool support relative to the processing spindles takes place in the exchange position by means of the stops 20, which for the transfer of the used tools 8a to the tool support adopt the first upper stop position shown in FIG. 4 and for the transfer of the new tools 8n to the processing spindles adopt the second lower position shown in FIG. 6. Since this alignment by the stops 20 does not have the necessary precision for a precise transfer, with reasonable mechanical costs, there are corresponding guide devices which are secured on one side on the tool support and on the other side on the spindle unit. These guide devices consist in the present embodiment of the guide bushes 17 and 18 arranged laterally next to the apertures 16 on the tool support 14, as well as of the guide rods 18a, which are disposed laterally on the spindle unit 5. The position of the guide bushes 17 and 18 on the tool support 14 as well as of the guide rods 18a on the spindle unit 5 is chosen so that the apertures 16 of the top row (cf. FIG. 1) with respect to their center are exactly flush with the axes of the processing spindles 7, when the guide rods 18a are inserted in the bores of the guide bushes 17. The apertures 16 of the lower row of the tool support 14 (cf. FIG. 1) are in turn exactly flush with the axes of the processing spindles 7, when the guide rods 18a are located in the bores of the guide bushes 18.

The guide bushes 17 and 18 as well as the guide rods 18a are dimensioned in their length and position so that in the withdrawn start position II they are not connected at all. But if the spindle unit 5 is pushed out of the withdrawn start position II into the tool transfer position III, the guide rods 18a penetrate, in accordance with the respective rough alignment achieved by the stops 20 via the arms 12, either into the guide bushes 17 or into guide bushes 18 whereby with relatively low design costs an extremely fine adjustment of the tool support 14 relative to the processing spindles is effected.

In the embodiment shown in FIGS. 1 to 7, the tool support 14 is rigidly interconnected with the arms 12. In FIGS. 8 to 11, two embodiments are shown in which the tool support 14 is rotatably linked with the arms 12.

Figure 8:
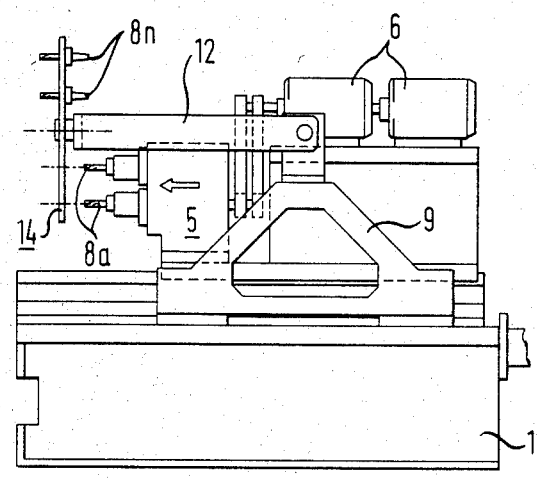
FIGS. 8 and 9 show a second embodiment of a tool exchanging device according to the invention in two phases.
Figure 9:
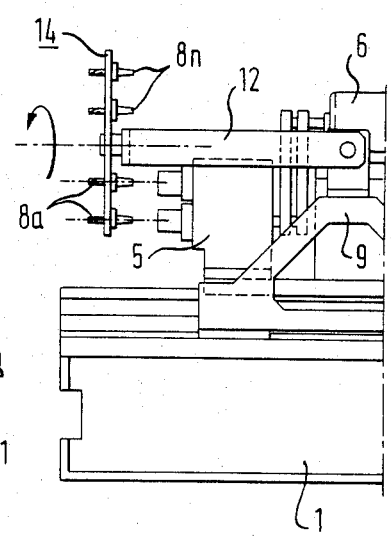
Figure 10:
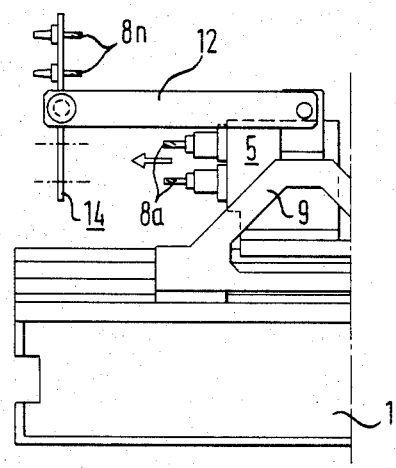
FIGS. 10 and 11 show two phases of a third embodiment of a tool exchanging device according to the invention.
Figure 11:
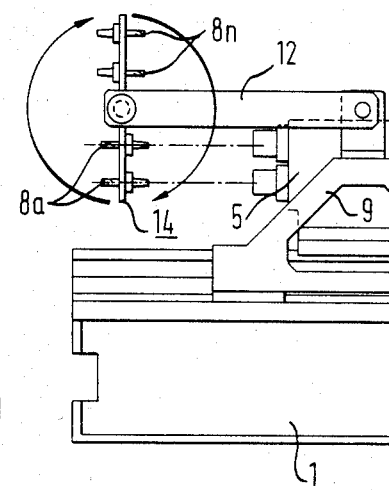

In the embodiment of FIGS. 8 and 9, the rotary axis of the tool support is parallel to the spindle axes, whereas in the embodiment shown in FIGS. 10 and 11 it is horizontal and perpendicular to the spindle axes.

In both embodiments, the tool support is now charged in the charging position (not shown) on the rear of the machine tool, so that following pivoting of the arms 12 into the exchange position shown in FIGS. 8 and 10, respectively, the empty apertures of the tool support 14 come to rest in front of the processing spindles with the tools 8a to be exchanged located therein. By displacement from the withdrawn start position into the tool transfer position the tools 8a to be exchanged—as described above in connection with the first embodiment—are transferred to the tool support 14. Then the spindle unit 5 is again returned to the retracted start position, as in FIG. 9 or 11.

In contrast to the first embodiment, the new tools 8n in the tool support 14 are not rotated by the lowering of the arms 12, but by the rotation of the tool support 14 around the respective axis in front of the empty processing spindles 7, as shown in FIG. 9 or 11 by the arrows. When the new tools 8n have reached their positions in front of the empty processing spindles 7, the spindle unit 5 is again thrust from the retracted start position into the tool transfer position, and it accepts the new tools 8n in the manner described above. By the retraction of the spindle unit the new tools 8n are extracted from the tool support 14, so that it can again be swung back into its charging position on the rear side of the machine tool. In the embodiments shown in FIGS. 8 to 11 too, in the exchange position a rough alignment of the arms 12 by the stops (not shown) and a fine adjustment by the guide devices in the form of guide rods and guide bushes take place.

Whereas in the case of the embodiments shown in FIGS. 1 to 9 the charging of the tool support in the charging position is always done from inside outwards, i.e. from the rear of the machine tool via the tool support to the operator, in the case of the embodiment according to FIGS. 10 and 11 the tool support can be charged directly from the rear. This is because the tool support in the case of the embodiment in FIGS. 10 and 11 is pivoted around an axis perpendicular to the spindle axes, so that the tools undergo a turning motion through 180° C., as can be seen in FIG. 11.

Tool exchanging devices such as are described in the embodiments of FIGS. 8 to 11 have the advantage that they can also be used with machine tools which have two or more rows of superimposed processing spindles. In such cases for spatial reasons it is not possible to secure the tool support 14 rigidly to the arms 14 as there is not enough space for lowering from the top to the lower stop position.

I claim:

1. A machine tool for mounting on a lateral unit or console unit of a transfer machine, and comprising: a spindle unit; a plurality of processing spindles; drive elements for the spindle unit; a tool support for the receipt of used and new tools, each corresponding in number to the number of spindles, said tool support having means for holding both used tools of said number and new tools of said number disposed to align with said processing spindles, and movable mounting means carrying the tool support for moving said tool support from a charging position on the rear of the machine tool, over the spindle unit and the associated drive elements, to a tool exchange position in front of said processing spindles.

2. A machine tool according to claim 1 wherein said mounting means is pivotable around a horizontal axis extending perpendicular to the axes of the processing spindles into the exchange position.

3. A machine tool for mounting on a lateral unit or console unit of a transfer machine, and comprising: a spindle unit; a plurality of processing spindles; drive elements for the spindle unit; a tool support for the receipt of used and new tools, and movable mounting means carrying the tool support for moving said tool support from a charging position on the rear of the machine tool, over the spindle unit and the associated drive elements, to a tool exchange position in front of said processing spindles, said movable mounting means comprising two arms arranged on respective sides of said machine tool, said arms being pivotally mounted at one of the ends thereof for pivoting around a horizontal axis extending perpendicularly to the axes of said processing spindles and having free ends, said tool support being secured to the arms at the free ends thereof and being movable by said arms around said axis from said charging position over the spindle unit and its associated drive elements, to said tool exchange position.

4. A machine tool according to claim 3 wherein each of said arms has a pivot bearing mounted in a bearing block.

5. A machine tool according to claim 4 wherein each bearing block is secured by an intermediate plate-shaped adapter unit on the top of said lateral or console unit.

6. A machine tool according to claim 3 or 4 wherein each arm has its own pivot drive, and the two pivot drives are interconnected via a rigid shaft.

7. A machine tool according to claim 4 wherein for rough alignment of the tool support in the exchange position, adjustable stops are provided on said bearing blocks, which stops cooperate with stop surfaces on said arms.

8. A machine tool according to claim 7 wherein for fine adjustment of the tool support in the exchange position, mutually corresponding guide devices are provided, which are secured both to the tool support and to the spindle unit.

9. A machine tool according to claim 8 wherein the guide devices include guide rods which cooperate with the guide bushes.

10. A machine tool according to claim 9 wherein the guide rods are arranged beside the spindle unit parallel to the spindles and are dimensioned so that in the tool exchange position they project into the guide bushes in the tool support.

11. A machine tool according to claim 3 wherein the tool support is linked rigidly with the arms.

12. A machine tool according to claim 3 wherein the tool support is connected with the arms for rotation around an axis which is horizontal and aligned perpendicularly to the spindle axes.

13. A machine tool according to claim 3 wherein the tool support is secured on the arms for rotation around an axis parallel to the spindle axes.

14. A machine tool according to claim 1 wherein the tool support is formed as a plate, frame or the like and is equipped with apertures for the tools.

15. A machine tool according to claim 12 or 13 wherein the tool support is rotatable by a separate drive around its axis.

16. A machine tool according to claim 3 wherein the arms are each provided with a counterweight.

17. A machine tool according to claim 3 wherein the arms are each provided with equalizer spring means.

18. A tool exchanging device for use in the machine tool of claim 1, 2, 4, 5, 8–14, 16, 17 or 20.

19. A transfer machine having a lateral unit or console unit on which is mounted a machine tool of claim 1, 2, 4, 5, 8–14, 16, 17 or 20.

* * * * *